United States Patent
Rindo et al.

[11] Patent Number: 5,389,288
[45] Date of Patent: Feb. 14, 1995

[54] LIQUID CRYSTAL DISPLAY

[75] Inventors: Katsuhiko Rindo; Tadashi Nishimori; Kazuo Kubota; Akira Yoshimatsu, all of Wakayama, Japan

[73] Assignee: Kao Corporation, Tokyo, Japan

[21] Appl. No.: 109,269

[22] Filed: Aug. 20, 1993

[30] Foreign Application Priority Data

Aug. 20, 1992 [JP] Japan .................. 4-221386
Jul. 6, 1993 [JP] Japan .................. 5-166881

[51] Int. Cl.$^6$ ............... C09K 19/00; G02F 1/1339
[52] U.S. Cl. .................. 252/299.01; 428/1; 359/81
[58] Field of Search ........ 252/299.01; 359/81, 359/100; 428/1

[56] References Cited

U.S. PATENT DOCUMENTS

| | | | |
|---|---|---|---|
| 4,470,668 | 9/1984 | Inoue et al. | 359/81 |
| 5,223,964 | 6/1993 | Nagano et al. | 359/81 |
| 5,231,527 | 7/1993 | Takanashi et al. | 359/81 |

FOREIGN PATENT DOCUMENTS 3246521 11/1991 Japan .

*Primary Examiner*—Shean Wu
*Attorney, Agent, or Firm*—Birch, Stewart, Kolasch & Birch

[57] ABSTRACT

A liquid crystal display which can provide a homogeneous display by preventing an abnormal orientation of a liquid crystal around the spacers or between the spacers during energization, and which comprises spacer particles each having, at least on the surface thereof, a non-ionic hydrophilic unit represented by the following formula (1):

$$RO-(R_1O)_m \qquad (1)$$

wherein R represents a $C_1$–$C_{18}$ alkyl group, a $C_2$–$C_{18}$ alkenyl group, a $C_6$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other.

15 Claims, 1 Drawing Sheet

LIQUID CRYSTAL DISPLAY

BACKGROUND OF THE INVENTION

1. Field of the Invention

The present invention relates to a liquid crystal display, spacer particles for a liquid crystal display and a process for producing spacer particles, and particularly to a liquid crystal display and spacer particles for a liquid crystal display which can provide a homogeneous display by preventing an abnormal orientation of the liquid crystal around the spacers or between the spacers during energization.

2. Description of the Related Art

A liquid crystal display has a structure shown in FIG. 1. Specifically, a transparent electrode 3 patterned into a predetermined configuration and an orientation film 4 covering the transparent electrode 3 are provided on the surface of each of the upper and lower glass substrates 2, and a liquid crystal material 5 is provided in the space between the two glass substrates 2. The peripheral portions of the glass substrates 2 are sealed with a sealing agent 6. In order to maintain the liquid crystal cell gap constant, spacers 7 for the liquid crystal display are disposed in an evenly distributed manner. The liquid crystal cell gap is generally in the range of from 1 to 30 $\mu$m. Finally, a polarizing plate 1 is provided on each of the outer sides of the glass substrates 2 to complete a liquid crystal display cell. With respect to the spacer 7, various polymer particles are known (see, for example, Japanese Patent Publication-A No. 246521/1991 (published on Nov. 1, 1991).

TN (twisted nematic) and STN (supertwisted nematic) liquid crystal panels have a problem in that an abnormal orientation of a liquid crystal occurs around the spacers or between the spacers in an energized state and this region, i.e., the region containing the abnormal orientation of the liquid crystal, increases with an increase in the energization time. Although the cause of the abnormal orientation has not yet been determined, the occurrence of the abnormal orientation is thought to be attributable to the interaction between the liquid crystal molecules and the surfaces of the liquid crystal spacers.

Further, static electricity tends to occur when a protective film is removed, which often brings about a problem in the occurrence of an abnormal orientation of the liquid crystal molecules around the spacers.

In order to prevent this unfavorable phenomenon, the so-called "aging operation (annealing step)" of the liquid crystal panel is conducted in the production of liquid crystal panels. This process, however, leads to problems such as a lowering in the production efficiency.

DISCLOSURE OF THE INVENTION

Summary of the Invention

The present inventors have made extensive studies with a view toward solving the above-described problems and to provide a liquid crystal display, free from the abnormal orientation of the liquid crystal between the spacers and spacer particles for such a liquid crystal display, which has led to the completion of the present invention.

Thus, the present invention provides spacer particles or spacer particulates for a liquid crystal display each having, at least on the surface portion thereof, a nonionic hydrophilic unit represented by the following formula (1):

$$RO-(R_1O)_{\overline{m}} \quad (1)$$

wherein R represents a $C_1$-$C_{18}$ alkyl group, a $C_2$-$C_{18}$ alkenyl group, a $C_6$-$C_{18}$ aryl group, a $C_7$-$C_{18}$ alkylaryl group, a $C_1$-$C_{18}$ acyl group, a $C_2$-$C_{18}$ alkylcarbamoyl group, a $C_2$-$C_{18}$ acylcarbamoyl group or a $C_7$-$C_{18}$ arylcarbamoyl group; $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other, and a liquid crystal display comprising spacer particles each spacer particle having, at least on the surface portion thereof, a nonionic hydrophilic unit represented by the above formula (1).

The $C_7$-$C_{18}$ alkylaryl group means an alkyl-substituted aryl group wherein the alkyl group as the substituent is present one or more, with the proviso that the total carbon atom number is 7 to 18. The $C_1$-$C_{18}$ acyl group represents by the formula: $R_a$—CO—, wherein $R_a$ is a hydrogen atom, a $C_1$-$C_{17}$ alkyl group, a $C_2$-$C_{17}$ alkenyl group or a $C_6$-$C_{17}$ substituted or unsubstituted aryl group. The $C_2$-$C_{18}$ alkylcarbamoyl group represents by the formula: $R_b$—NHCO—, wherein $R_b$ is a $C_1$-$C_{17}$ alkyl group. The $C_2$-$C_{18}$ acylcarbamoyl group represents by the formula: $R_c$—CO—NHCO—, wherein $R_c$ is a hydrogen atom, a $C_1$-$C_{16}$ alkyl group, a $C_2$-$C_{16}$ alkenyl group or a $C_6$-$C_{16}$ substituted or unsubstituted aryl group. The $C_7$-$C_{18}$ arylcarbamoyl group represents by the formula: $R_d$—NHCO—, wherein $R_d$ is a $C_6$-$C_{17}$ substituted or unsubstituted aryl group.

R in the formula (1) preferably represents a $C_1$-$C_{18}$ alkyl group, a $C_6$-$C_{18}$ aryl group, a $C_7$-$C_{18}$ alkylaryl group or a $C_1$-$C_{18}$ acyl group.

In other words, the present invention relates to a liquid crystal display using, as a spacer for the liquid crystal display, particles each having, at least on the surface portion thereof, a nonionic hydrophilic unit represented by the formula (I):

$$RO-(R_1O)_{\overline{m}} \quad (I)$$

wherein R represents an alkyl, alkenyl, aryl, alkylaryl, acyl, alkylcarbamoyl, acylcarbamoyl or arylcarbamoyl group having 1 to 18 carbon atoms, $R_1$ represents a linear or branched alkylene group having 2 to 4 carbon atoms wherein a hydroxyl group may be substituted for a hydrogen atom, and m is an integer of 1 to 100 with the proviso that the $R_1$'s may be the same or different from each other when m is an integer of 2 to 100.

R in the formula (I) preferably represents an alkyl, alkylaryl, acyl, alkylcarbamoyl or arylcarbamoyl group having 1 to 18 carbon atoms.

Further, the present invention provides the following Production Processes 1 to 3 for producing spacer particles for a liquid crystal display:

Production Process 1

A process for producing spacer particles for a liquid crystal display which comprises copolymerizing a monomer with a compound represented by the following formula (2):

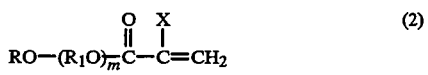

$$RO-(R_1O)_{\overline{m}}\overset{O}{\overset{\|}{C}}-\overset{X}{\overset{|}{C}}=CH_2 \qquad (2)$$

wherein R represents a $C_1$–$C_{18}$ alkyl group, a $C_2$–$C_{18}$ alkenyl group, a $C_6$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; m is a positive number of 1 to 100 on the average, with the proviso that the plural $R_1$'s may be the same or different from each other; and X represents a hydrogen atom or a methyl group;

Production Process 2

A process for producing spacer particles for a liquid crystal display which comprises reacting, i.e., surface-treating, core particles, e.g., polymeric particles, each having, on the surface portion of the core particle, a substituent group which reacts with a compound represented by tile following formulas (3) or (4) with the compound represented by the following formulas (3) or (4):

$$RO-(R_1O)_{\overline{m}}Z \qquad (3)$$

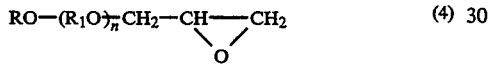

$$RO-(R_1O)_{\overline{n}}CH_2-CH\underset{O}{-\!\!\diagdown\!\!\diagup\!\!-}CH_2 \qquad (4)$$

wherein R represents a $C_1$–$C_{18}$ alkyl group, a $C_2$–$C_{18}$ alkenyl group, a $C_6$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; m is a positive number of 1 to 100 on the average, with the proviso that the plural $R_1$'s may be the same or different from each other; n is zero or, on the average, a positive number of more than 0 to 100, with the proviso that the plural $R_1$'s may be the same or different from each other; and Z represents a hydrogen atom, a metal atom, an aminoalkyl group or a carboxyalkyl group; and Production Process 3

A process for producing spacer particles for a liquid crystal display which comprises reacting, i.e., surface-modifying, core particles each having, at least on the surface portion of the core particle, a nonionic hydrophilic unit represented by the following formula (5):

$$HO-(R_1O)_{\overline{m}} \qquad (5)$$

wherein $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other, with an acid halide having a $C_1$–$C_{18}$ acyl group, an acid anhydride having a $C_1$–$C_{18}$ acyl group, an isocyanate compound having a $C_1$–$C_{18}$ alkyl group, a $C_1$–$C_{18}$ acyl group or a $C_6$–$C_{18}$ aryl group, a $C_3$–$C_{18}$ α-olefin epoxide or an epoxy compound represented by the formula (4):

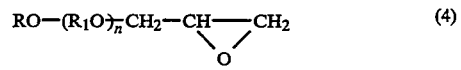

$$RO-(R_1O)_{\overline{n}}CH_2-CH\underset{O}{-\!\!\diagdown\!\!\diagup\!\!-}CH_2 \qquad (4)$$

wherein R represents a $C_1$–$C_{18}$ alkyl group, a $C_2$–$C_{18}$ alkenyl group, a $C_8$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; and n is zero or, on the average, a positive number of more than 0 to 100, with the proviso that the plural $R_1$'s may be the same or different from each other.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
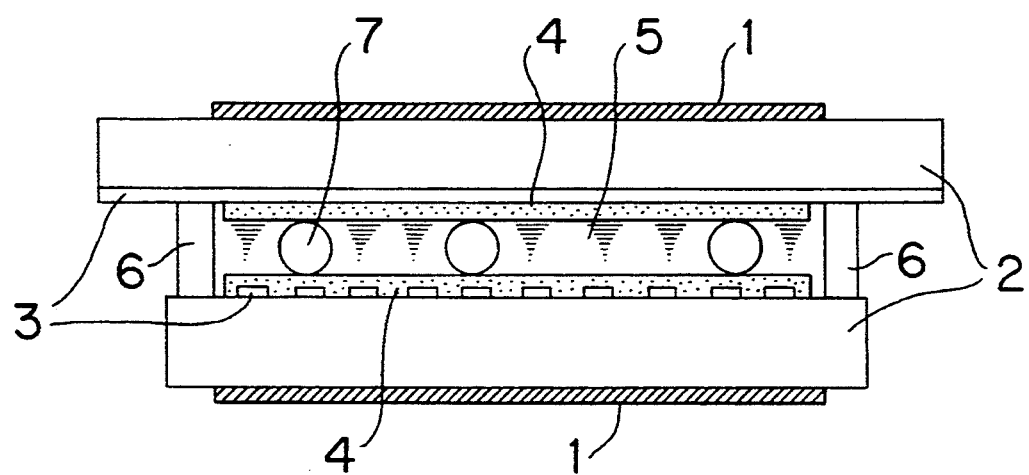
FIG. 1 is a cross-sectional view of one embodiment of a liquid crystal display.

Spacer particles each having at least on the surface thereof a nonionic hydrophilic unit represented by the formula (1) to be used in the present invention can be produced, for example, by the following Production Processes 1 to 3.

Each process will now be described in more detail.

Production Process 1

Examples of the compound represented by the above formula (2) (hereinafter simply referred to as the "compound (2)") which can be used in the preparation of the spacer particles of the present invention include a monomer, which is soluble in water or an alcoholic organic solvent, wherein a $C_1$–$C_{18}$ alkyl group such as a methyl, propyl, isopropyl, butyl or stearyl group, a $C_2$–$C_{18}$ alkenyl group such as a propenyl group, a $C_6$–$C_{18}$ aryl group such as a phenyl or biphenyl group, a $C_7$–$C_{18}$ alkylaryl group such as a nonylphenyl, tolyl or xylyl group, a $C_1$–$C_{18}$ acyl group such as a formyl, acetyl, propionyl, butyryl, stearoyl or benzoyl group, a $C_2$–$C_{18}$ alkylcarbamoyl group such as a methylcarbamoyl, propylcarbamoyl or butylcarbamoyl group, a $C_2$–$C_{18}$ acylcarbamoyl group such as a propionylcarbamoyl or benzoylcarbamoyl group, or a $C_7$–$C_{18}$ arylcarbamoyl group such as a phenylcarbamoyl group is substituted for the hydrogen atom of a terminal hydroxyl group of a mono(meth)acrylic ester of a polyhydric alcohol, such as hydroxyethyl (meth)acrylate, diethylene glycol mono(meth)acrylate, polyoxyethylene mono(meth)acrylate, glycerol mono(meth)acrylate, polyethylene glycol/polypropylene glycol mono(meth)acrylate or butanediol mono(meth)acrylate.

In general, a mixture comprising compounds each represented by the formula (2) wherein m is zero or a positive integer, and having m, as the average value, of 1 to 100 is used as the compound (2). In the present invention, a mixture comprising compounds each represented by the formula (2) wherein m is zero or a positive integer, and having m, i.e., an average number of moles of added alkylene oxide, of preferably from 1 to 50, still more preferably from 5 to 30, is employed.

Spacer particles each having, at least on the surface thereof, a nonionic hydrophilic unit represented by the above formula (1) can be produced by using the compound (2) according to the following three methods. Namely, the Production Process 1 includes the following methods A, B and C.

The first method, i.e., method A, comprises copolymerizing compound (2) with a vinyl compound and a crosslinkable monomer by suspension copolymerization, seed copolymerization or other methods.

By vinyl compound in meant those having one vinyl group, and includes styrene monomers such as styrene, p-methylstyrene, p-chlorostyrene or p-t-butoxystyrene, (meth)acrylic ester monomers such as methyl (meth)acrylate or ethyl (meth)acrylate, and vinyl monomers such as vinyl acetate or vinyl chloride.

The crosslinkable monomer includes divinylbenzene, ethylene glycol di(meth)acrylate, diethylene glycol di(meth)acrylate, trimethylolpropane tri(meth)acrylate, dipentaerythritol hexa(meth)acrylate, methylenebisacrylamide and divinyloxybutane.

The monomer, i.e., each of the vinyl compound and the crosslinkable monomer, is not limited to those described above only. It is also possible to use the monomers in the form of a mixture of two or more of them.

The second method, i.e., method B, comprises adding compound (2) and a polymerization initiator to a copolymerization system within or during the polymer conversion of from 10 to 90% in the production of copolymer particles and continueing copolymerization. Examples of the copolymer comprising comonomers other than compound (2) include but are not limited to a crosslinked styrene copolymer such as a styrene/divinylbenzene, styrene/ethylene glycol dimethacrylate or styrene/butadiene copolymer; a crosslinked (meth)acrylic ester copolymer such as a methyl (meth)acrylate/divinylbenzene, methyl (meth)acrylate/ethylene glycol dimethacrylate or methyl (meth)acrylate/methylenebisacrylamide copolymer; or a crosslinked olefin copolymer such as a ethylene/butadiene, methyl vinyl ether/divinyloxybutane, vinyl acetate/divinyloxybutane or vinyl chloride/divinylbenzene copolymer. In this case, a polyfunctional monomer such as ethylene glycol di(meth)acrylate, diethylene glycol di(meth)acrylate, trimethylolpropane tri(meth)acrylate, dipentaerythritol hexa(meth)acrylate or divinyloxybutane may be added as a crosslinkable monomer and may be copolymerized together with compound (2).

When compound (2) is added to a copolymerization system after the polymer conversion exceeds 90%, spacer particles to be obtained difficultly exhibit the effect of the present invention, i.e., the prevention of an abnormal orientation of the liquid crystal around the spacer particles or between the spacer particles during energization.

The polymer conversion was determined by the following gravimetric method. Specifically, a given weight of a dispersion of crosslinked copolymer particles was sampled from a polymerization vessel during synthesis and dispersed in a large amount of methanol (containing 1000 ppm of hydroquinon monomethyl ether). The resultant precipitates were isolated by filtration, centrifugation or other methods and dried in vacuo to calculate the polymer conversion by the following equation:

$$\text{polymer conversion (\%)} = \frac{\text{weight (g) of resultant precipitates}}{\substack{\text{weight (g) of monomer in dispersion} \\ \text{of crosslinked copolymer particles}}} \times 100$$

The weight (g) of monomer in dispersion of crosslinked copolymer particles is the product of the weight (g) of sampled dispersion and the concentration (%) of fed mononer.

Compound (2) may be added directly, or alternatively, it may be added in the form of an emulsion formed by dispersing the compound (2) in an aqueous solution of a surfactant, such as sodium lauryl sulfate, with the use of a homomixer or the like, to the copolymerization system.

The third method, i.e., method C, comprises impregnating compound (2), a crosslinkable monomer described above and a polymerization initiator into copolymer particles, generally crosslinked copolymer particles, and further conducting copolymerization to provide the spacer particles for a liquid crystal display according to the present invention. Examples of the copolymers constituting the copolymer particles include but are not limited to a crosslinked styrene copolymer such as a styrene/divinylbenzene, styrene/ethylene glycol dimethacrylate or styrene/butadiene copolymer; a crosslinked (meth)acrylic ester copolymer such as a methyl (meth)acrylate/divinylbenzene, methyl (meth)acrylate/ethylene glycol dimethacrylate or methyl (meth)acrylate/methylenebisacrylamide copolymer; or a crosslinked olefin copolymer such as a ethylene/butadiene, methyl vinyl ether/divinyloxybutane, vinyl acetate/divinyloxybutane or vinyl chloride/divinylbenzene copolymer.

In method C, the total amount of addition of compound (2) and the crosslinkable monomer is not limited. For example, based on 50 parts by weight of the crosslinked copolymer particles, about 5 to 500 parts by weight of the total amount of compound (2) and the crosslinkable monomer may be used although it varies also depending upon the solubility thereof in water. When the total amount of addition is less than 5 parts by weight, it is impossible to provide copolymer particles having a satisfactory effect of preventing the abnormal orientation of the liquid crystal. On the other hand, when the total amount of addition is larger than 500 parts by weight, the addition is apt to bring about a problem such as an agglomeration of the copolymerization system.

The solvent to be used in the impregnation may be any solvent that can dissolve the above-described monomers but cannot dissolve the crosslinked copolymer particles. Among these solvents, a solvent capable of swelling the crosslinked copolymer particles is still preferred. Examples of suitable solvents include tetrachloroethane, dichloroethane, toluene, DMF (dimethylformamide), DMSO (dimethyl sulfoxide) and THF (tetrahydrofuran). The impregnation is conducted at room temperature to about 40° C. Alternatively, the impregnation may be conducted by dispersing and/or dissolving the crosslinked copolymer particles, compound (2) and the initiator in a solvent such as methanol or ethanol and removing the solvent by vacuum distillation at room temperature to about 40° C.

In the above-described method wherein a mixture of the polymerization initiator and the monomers, i.e., compound (2), the crosslinkable monomer and so on, is impregnated into the crosslinked copolymer particles, it is also possible to add a known polymer soluble in the above-described solvents, such as polyvinyl alcohol, polytetrahydrofuran, polyethylene oxide, polypropylene oxide, polyethylenimine or polyvinylpyrrolidone, to the solvent.

The solvent to be used in the copolymerization after the impregnation is not particularly limited so long as it does not dissolve the polymerizable monomer, i.e., compound (2) and the crosslinkable monomer, and the crosslinked copolymer particles, and examples thereof include water containing an inorganic salt, aliphatic hydrocarbon solvents such as hexane and alicyclic hydrocarbon solvents such as cyclohexane. In the step of copolymerization, it is also possible to use various surfactants or protective colloids for the purpose of improving the dispersion stability of the copolymer particles.

In the above-described three methods, only one compound belonging to compound (2) may be used, or alternatively two or more compounds belonging to compound (2) may be used in the form of a mixture thereof. As the vinyl compound, only one compound may be used, or alternatively a mixture comprising two or more compounds belonging to the vinyl compound may be used. As the crosslinkable monomer, only one compound may be used, or alternatively a mixture comprising two or more compounds belonging to the crosslinkable monomer may be used.

The weight ratio of the amount of compound (2) to the polymerizable monomer(s) other than compound (2) such as the crosslinking monomer and the vinyl compound is preferably in the range of from 1:99 to 70:30. When the proportion of the amount of compound (2) is less than 1% by weight, the hydrophilicity of the spacer particles obtained becomes so small that the effect of the present invention difficulty exhibits. On the other hand, when it exceeds 70% by weight, the proportion of the crosslinkable monomer inevitably becomes so low that the strength of the particles obtained is unsatisfactory, which is causative of the occurrence of irregular color during display when incorporated in a liquid crystal display panel as spacer particles.

The polymerization initiator usable in the above-described three methods may be an oil-soluble polymerization initiator commonly used in the art. Examples thereof include peroxide initiators such as benzoyl peroxide, lauroyl peroxide, o-chlorobenzoyl peroxide and o-methoxybenzoyl peroxide and azo initiators such as 2,2-azobisisobutyronitrile and 2,2-azobis(2,4-dimethylvaleronitrile).

Production Process 2

Examples of the compound represented by the above formula (3) (hereinafter simply referred to as the "compound (3)") which can be used in this process include compounds wherein a $C_1$–$C_{18}$ alkyl group such as a methyl, propyl, isopropyl, butyl or stearyl group, a $C_2$–$C_{18}$ alkenyl group such as a propenyl group, a $C_6$–$C_{18}$ aryl group such as a phenyl or biphenyl group, a $C_7$–$C_{18}$ alkylaryl group such as a nonylphenyl, tolyl or xylyl group, a $C_1$–$C_{18}$ acyl group such as a formyl, acetyl, propionyl, butyryl, stearoyl or benzoyl group, a $C_2$–$C_{18}$ alkylcarbamoyl group such as a methyl-carbamoyl, propylcarbamoyl or butylcarbamoyl group, a $C_2$–$C_{18}$ acylcarbamoyl group such as a propionylcarbamoyl or benzoylcarbamoyl group or a $C_7$–$C_{18}$ arylcarbamoyl group such as a phenylcarbamoyl group is substituted for the hydrogen atom of one terminal hydroxyl group of polyethylene glycol, polyethylene glycol monoaminopropyl ether, polyethylene glycol monocarboxymethyl ether, polyethylene glycol monocarboxyethyl ether or the like, and alkoxides wherein a metal atom such as an alkali metal atom, an alkaline earth metal atom, aluminum or titanium is substituted for the hydrogen atom of a terminal hydroxyl group of a polyethylene glycol monoalkyl (the alkyl group having 1 to 18 carbon atoms) ether.

Examples of the compound represented by the above formula (4) (hereinafter simply referred to as the "compound (4)") include a glycidyl ether of a $C_1$–$C_{18}$ monohydric alcohol and compounds wherein a $C_1$–$C_{18}$ alkyl group, a $C_2$–$C_{18}$ alkenyl group, a $C_6$–$C_{18}$ aryl group, a $C_7$–$C_{18}$ alkylaryl group or a $C_1$–$C_{18}$ acyl group is substituted for the hydrogen atom of a terminal hydroxyl group of polyethylene glycol monoglycidyl ether. These compounds may be used alone or in the form of a mixture of two or more of them.

Examples of core particles each having on the surface thereof a substituent group which is reactive with the compounds (3) or (4) include particles of inorganic polymers such as silica and the like, those of vinyl polymers such as a divinylbenzene/methacrylic acid copolymer, a divinylbenzene/glycidyl methacrylate copolymer and a divinylbenzene/vinyl isocyanate copolymer, and those of polycondensed polymers such as cured resins of benzoguanamine and a melamine resin. When a compound represented by the formula (3) wherein z is a hydrogen atom is employed, the core particles are preferably those having, at least on the surface portion thereof, an epoxy group or an isocyanate group.

Examples of the method of subjecting these core particles to a surface treatment with the compounds (3) or (4) include a method which comprises dispersing the core particles in a solvent, adding the compounds (3) or (4) and allowing the reaction to proceed.

In general, a mixture comprising compounds each represented by the formula (3) wherein m is zero or a positive integer, and having m, as the average value, of 1 to 100 is used as the compound (3). In the present invention, a mixture comprising compounds each represented by the formula (3) wherein m is zero or a positive integer, and having m, i.e., an average number of moles of added alkylene oxide, of preferably from 1 to 50, still more preferably from 5 to 30, is employed.

In general, a mixture comprising compounds each represented by the formula (4) wherein n is zero or a positive integer, and having n, as the average value, of more than 0 to 100 is used as the compound (4). Alternatively, a compound represented by the formula (4) wherein n is zero may be used. In the present invention, a mixture comprising compounds each represented by the formula (4) wherein n is zero or a positive integer, and having n, i.e., an average number of moles of added alkylene oxide, of preferably from 1 to 50, still more preferably from 5 to 30, is employed.

Production Process 3

In this process, core particles each having at least on the surface thereof a nonionic hydrophilic unit represented by the above formula (5) are subjected to a surface modification by a method wherein the core particles are reacted with an acid halide or acid anhydride each having a $C_1$–$C_{18}$ acyl group to conduct an esterification reaction, a method wherein the core particles are reacted with an isocyanate compound having a $C_1$–$C_{18}$ alkyl group, a $C_1$–$C_{18}$ acyl group or a $C_6$–$C_{18}$ aryl group to conduct a reaction for introducing a carbamate group, or a method wherein the core particles are reacted with a $C_3$–$C_{18}$ α-olefin epoxide or an epoxy compound represented by the above formula (4) to conduct an etherification reaction.

The core particles each having at least on the surface thereof a nonionic hydrophilic unit represented by the above formula (5) to be used in this process are produced by copolymerizing a monomer soluble in water or an alcoholic organic solvent, for example, a (meth)acrylic ester monomer having a hydroxyl group such as hydroxyethyl (meth)acrylate, diethylene glycol mono(meth)acrylate, polyoxyethylene mono(meth)acrylate, glycerol mono(meth)acrylate, polyethylene glycol polypropylene glycol mono(meth)acrylate or butanediol mono(meth)acrylate, with an other polymerizable monomer, i.e., a vinyl compound, and a crosslinkable monomer in the same manner as that described above in connection with the Production Precess 1.

The compound which gives the nonionic hydrophilic unit represented by the formula (5) to the core particles to be obtained is sometimes used in the form of a mixture comprising compounds each having the nonionic hydrophilic unit represented by the formula (5) wherein m is zero or a positive integer, and having m, as the average value, of 1 to 100. In the present invention, a mixture comprising compounds each having the nonionic hydrophilic unit represented by the formula (5) wherein m is zero or a positive integer, and having m, i.e., an average number of moles of added alkylene oxide, of preferably from 1 to 50, still more preferably from 5 to 30, is employed.

Examples of the acid halide or acid anhydride having a $C_1$–$C_{18}$ acyl group include acid halides such as n-propionyl chloride, n-butyryl chloride, n-heptadecanoyl chloride and valeryl bromide and acid anhydrides such as acetic anhydride and butyric anhydride.

Examples of the isocyanate compound having a $C_1$–$C_{18}$ alkyl group, a $C_6$–$C_{18}$ aryl group or a $C_1$–$C_{18}$ acyl group include methyl isocyanate, ethyl isocyanate, isopropyl isocyanate, isobutyl isocyanate, phenyl isocyanate, tolyl isocyanate, α-(or β-)naphthyl isocyanate, propionyl isocyanate, butyryl isocyanate and benzoyl isocyanate.

Examples of the $C_3$–$C_{18}$ α-olefin epoxide include 1-hexene oxide, 1-decene oxide and 1-hexadecene oxide.

Examples of the epoxy compound represented by the above formula (4) include 2-ethylhexyl glycidyl ether, lauryl glycidyl ether, phenyl glycidyl ether, p-tert-butylphenyl glycidyl ether, phenol $(EO)_5$ glycidyl ether and lauryl alcohol $(EO)_{15}$ glycidyl ether.

Spacer particles for a liquid crystal display according to the present invention are produced as described above. The average particle diameter of the spacer particles is generally about 2 to 10 μm although it varies depending upon the purpose and kind of the liquid crystal panel. When the spacer particles having a broad particle diameter distribution is incorporated in a liquid crystal display panel, the distance between two transparent electrodes within the panel cannot be maintained constant, which is causative of the occurrence of irregular color during the display, so that the standard deviation of the particle diameter distribution of the spacer particles is preferably 20% or less of the average particle diameter.

In the liquid crystal display of the present invention, the spacer particles thus provided are used as a spacer for a liquid crystal display.

The spacer particles for a liquid crystal display according to the present invention is excellent in the effect of preventing the abnormal orientation, which renders the spacer particles of the present invention suitable for use as a spacer for a liquid crystal display.

EXAMPLES

The present invention will now be described in more detail with reference to the following Examples which should not be considered to limit the scope of the present invention. In the Examples, part(s) is by weight.

Example 1

800 parts of a 3% aqueous solution of polyvinyl alcohol (GH-17 manufactured by Nippon Synthetic Chemical Industry Co., Ltd.; degree of saponification: 86.5 to 89% by mole) was added to a mixed solution comprising 40 parts of styrene, 40 parts of divinylbenzene (purity: 55%; DVB-570 manufactured by Nippon Steel Chemical Co., Ltd.), 20 parts of methoxypolyethylene glycol monomethacrylate (NK-Ester M-230G manufactured by Shin-Nakamura Chemical Co., Ltd.; average number of moles of added EO, m=23) and 1.0 part of 2,2-azobisisobutyronitrile to conduct fine dispersion, and suspension copolymerization was conducted in a nitrogen gas stream at 80° C. for 15 hours. The product was subjected to classification to provide crosslinked copolymer particles having an average particle diameter of 8.3 μm and a standard deviation of 1.5 μm. The resultant crosslinked copolymer particles were washed with deionized water and a solvent, isolated and dried to provide spacer particles for a liquid crystal display.

The spacer particles provided by the above-described method were used to prepare a supertwisted liquid crystal display having a cell size of about 10 inch in terms of the diagonal distance, the number of dots of 640×480 and a cell gap of 6.0 μm. A scanning voltage was applied to this display to observe the display characteristics. As a result, a high-quality display free from an uneven display could be provided over the whole area. Further, no abnormal orientation of the liquid crystal was observed around or between the spacer particles.

Example 2

800 parts of a 3% aqueous solution of polyvinyl alcohol (GH-17 manufactured by Nippon Synthetic Chemical Industry Co., Ltd.; degree of saponification: 86.5 to 89% by mole) was added to a mixed solution comprising 40 parts of styrene, 60 parts of divinylbenzene (purity: 55%) and 1.0 part of 2,2-azobisisobutyronitrile to conduct fine dispersion, and copolymerization was conducted in a nitrogen gas stream under stirring at 80° C. for one hour to provide a copolymerization system. The polymer conversion in this case was determined by the gravimetric method and found to be 36.3%.

An emulsion produced by ultrasonically treating a mixture comprising 1.0 part of 2,2-azobisisobutyronitrile, 10 parts of ethylene glycol dimethacrylate (NK-Ester 1G manufactured by Shin-Nakamura Chemical Co., Ltd.), 40 parts of phenoxypolyethylene glycol monomethacrylate (NK-Ester AMP-60G manufactured by Shin-Nakamura Chemical Co., Ltd.; average number of moles of added EO, m=6), 1.5 parts of sodium lauryl sulfate and 200 parts of deionized water was added to the copolymerization system. The copolymerization was further allowed to proceed in a nitrogen gas stream under stirring at 80° C. for additional 12 hours. The resultant particles were washed with deionized water and a solvent, classified, isolated and dried to provide spacer particles having an average particle diameter of 7.5 μm and a standard deviation of 1.4 μm for use in a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 3

Crosslinked copolymer particles having an average particle diameter of 10 μm and a standard deviation of 1.8 μm were produced in the same manner as that of Example 1, except that use was made of 50 parts of styrene and 50 parts of divinylbenzene (purity: 55%) as the monomers.

5 parts of the resultant crosslinked copolymer particles were dispersed in 20 parts of N,N-dimethylformamide (DMF). 0.18 part of 2,2-azobisisobutyronitrile (an initiator), 2 parts of ethylene glycol dimethacrylate (a crosslinkable monomer) and 10 parts of nonylphenoxypolyethylene glycol acrylate (Light Acrylate NP-10EA manufactured by Kyoeisha Yushi Kagaku Kogyo Co., Ltd.; average number of moles of added EO, m=10) (a polymerizable monomer) were added thereto, and the mixture was stirred at 35° C. for 15 hours to impregnate the initiator, crosslinkable monomer and polymerizable monomer into the crosslinked copolymer particles. The solution was filtered and the resultant polymer was redispersed in 450 parts of cyclohexane, to which was added 0.45 part of Rheodol SP-S10 (a nonionic surfactant manufactured by Kao Corp.) to copolymerize the crosslinkable monomer and polymerizable monomer at 62° C. for 15 hours. The resultant particles were washed with deionized water and a solvent, isolated and dried to provide spacer particles for a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 4

438 parts of polyethylene glycol monomethacrylate (Blemmer PE350 manufactured by Nippon Oils & Fats Co., Ltd.; average number of moles of added EO, m=8) was dispersed in chloroform, 158 parts of pyridine was added thereto, and the mixture was stirred. 213 parts of n-butyryl chloride was dropwise added thereto with ice cooling, and a reaction was allowed to proceed at room temperature for 5 hours to complete an esterification reaction.

After methanol was added to the reaction mixture to decompose excess n-butyryl chloride, deionized water was added thereto to cause phase separation to thereby isolate a water phase. Then, an aqueous ammonium chloride solution was added to the water phase and the mixture was extracted with ethyl acetate to isolate polyethylene glycol monomethacrylate butanoate.

Suspension copolymerization was conducted in the same manner as that of Example 1, except that 40 parts of styrene, 40 parts of divinylbenzene (purity: 55%) and 20 parts of polyethylene glycol monomethacrylate butanoate synthesized by the above-described method were used as the monomers, thereby providing crosslinked copolymer particles having an average particle diameter of 7.2 μm and a standard deviation of 1.3 μm. The resultant crosslinked copolymer particles were washed with deionized water and a solvent, isolated and dried to provide spacer particles for a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 5

Suspension copolymerization was conducted in the same manner as that of Example 1, except that 65 parts of divinylbenzene (purity: 81%; DVB-810 manufactured by Nippon Steel Chemical Co., Ltd.), 10 parts of ethylene glycol dimethacrylate (NK-Ester 1G manufactured by Shin-Nakamura Chemical Co., Ltd.) and 25 parts of polyethylene glycol monomethacrylate (Blemmer PE350 manufactured by Nippon Oils & Fats Co., Ltd.; average number of moles of added EO, m=8) were used as the monomers and 4 parts of benzoyl peroxide was used as the initiator instead of 2,2-azobisisobutyronitrile, thereby providing crosslinked copolymer particles having an average particle diameter of 7.8 μm and a standard deviation of 1.4 μm.

30 parts of the resultant crosslinked copolymer particles were dispersed in 90 parts of chloroform and 50 parts of pyridine was added thereto. Then 50 parts of n-butyryl chloride was dropwise added thereto with ice cooling, and a reaction was allowed to proceed at room temperature for additional 5 hours to complete an esterification reaction. After methanol was added to the reaction mixture to decompose excess n-butyryl chloride, purification by filtration was conducted and the solid matter was washed with methanol and deionized water to isolate spacer particles for a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 6

800 parts of a 3% aqueous solution of polyvinyl alcohol (GH-17 manufactured by Nippon Synthetic Chemical Industry Co., Ltd.; degree of saponification: 86.5 to 89% by mole) was added to a mixed solution comprising 40 parts of styrene, 40 parts of divinylbenzene (purity: 55%; DVB-570 manufactured by Nippon Steel Chemical Co., Ltd.), 20 parts of polyethylene glycol monomethacrylate (Blemmer PE350 manufactured by Nippon Oils & Fats Co., Ltd.; average number of moles of added EO, m=8) and 1.0 part of 2,2-azobisisobutyronitrile to conduct fine dispersion, and suspension copolymerization was conducted in a nitrogen gas stream at 80° C. for 15 hours. The resultant particles were classified to provide crosslinked copolymer particles having an average particle diameter of 8.1 $\mu$m and a standard deviation of 1.4 $\mu$m.

10 parts of the resultant crosslinked copolymer particles were dispersed in 50 parts of chloroform and 80 parts of triethylamine was added thereto. Then, 50 parts of n-propionyl chloride was dropwise added thereto with ice cooling, and a reaction was allowed to proceed at room temperature for additional 5 hours to complete an esterification reaction. After methanol was added to the reaction mixture to decompose excess n-propionyl chloride, purification by filtration was conducted and the solid matter was washed with methanol and deionized water to isolate spacer particles for a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 7

Crosslinked copolymer particles having an average particle diameter of 8.5 $\mu$m and a standard deviation of 1.6 $\mu$m were produced in the same manner as that of Example 1, except that methoxydipropylene glycol acrylate (Light Acrylate DPM-A manufactured by Kyoeisha Yushi Kagaku Kogyo Co., Ltd.) was used instead of methoxypolyethylene glycol monomethacrylate (NK-Ester M-230G manufactured by Shin-Nakamura Chemical Co., Ltd.; average number of moles of added EO, m=23). The resultant crosslinked copolymer particles were washed with deionized water and a solvent, isolated and dried to provide spacer particles for a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 8

Spacer particles having an average particle diameter of 7.6 $\mu$m and a standard deviation of 1.4 $\mu$m for use in a liquid crystal display was produced in the same manner as that of Example 3, except that methoxypolyethylene glycol methacrylate (Light Ester 041MA manufactured by Kyoeisha Yushi Kagaku Kogyo Co., Ltd.; average number of moles of added EO, m=30) was impregnated instead of nonylphenoxypolyethylene glycol acrylate.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 9

Spacer particles having an average particle diameter of 7.5 $\mu$m and a standard deviation of 1.4 $\mu$m for use in a liquid crystal display was produced in the same manner as that of Example 5, except that 135 parts of n-heptadecanoyl chloride was used instead of 50 parts of n-butyryl chloride.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Example 10

10 parts of silica particles (average particle diameter: 6.5 $\mu$m) were dispersed in 50 parts of dioxane to give a dispersion, and 30 parts of a mixed higher alcohol glycidyl ether comprising a $C_{12}$ higher alcohol glycidyl ether and a $C_{13}$ higher alcohol glycidyl ether (Epo Light M-1230 ($C_{12}$ 55%/$C_{13}$ 45%) manufactured by Kyoeisha Yushi Kagaku Kogyo Co., Ltd.) was added and dissolved in the dispersion. The mixture was allowed to react under reflux for 48 hours. After the completion of the reaction, purification by filtration was conducted, and the solid matter was washed with methanol and deionized water to isolate spacer particles for a liquid crystal display.

A liquid crystal display was prepared in the same manner as that of Example 1, except that use was made of the spacer particles provided here. A scanning voltage was applied to the resultant display to observe display characteristics. As a result, a high-quality display free from an uneven display could be provided over the whole area. Further, no abnormal orientation of the liquid crystal was observed around or between the spacer particles.

Comparative Example 1

Suspension copolymerization was conducted by using 50 parts of styrene and 50 parts of divinylbenzene (purity: 55%), and the resultant copolymer particles were classified to provide crosslinked copolymer particles having an average particle diameter of 6.2 $\mu$m and a standard deviation of 1.8 μm. The resultant cross-linked copolymer particles were washed with deionized water and a solvent, isolated and dried to provide spacer particles for a liquid crystal display.

A liquid crystal display was prepared in the same manner as that of Example 1, except that use was made of the spacer particles provided here, and display characteristics were observed. As a result, an abnormal orientation of the liquid crystal was observed around or between the spacer particles, so that a lowering in the quality of the display was observed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A liquid crystal display comprising spacer particles each spacer particle having, at least on the surface portion thereof, a nonionic hydrophilic unit represented by the following formula (1):

$$RO\!-\!(R_1O)_{\overline{m}} \quad (1)$$

wherein R represents a $C_1$–$C_{18}$ alkyl group, a $C_2$–$C_{18}$ alkenyl group, a $C_6$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other.

2. The liquid crystal display according to claim 1, wherein R in the formula (1) represents a $C_1$–$C_{18}$ alkyl group, a $C_7$–$C_{18}$ alkylaryl group, a $C_1$–$C_{18}$ acyl group, a $C_2$–$C_{18}$ alkylcarbamoyl group or a $C_7$–$C_{18}$ arylcarbamoyl group.

3. The liquid crystal display according to claim 1, wherein R in the formula (1) represents a $C_1$–$C_{18}$ alkyl group, a $C_6$–$C_{18}$ aryl group, a $C_7$–$C_{18}$ alkylaryl group or a $C_1$–$C_{18}$ acyl group.

4. The liquid crystal display according to claim 1, wherein the spacer particles are produced by copolymerizing a monomer with a compound represented by the following formula (2):

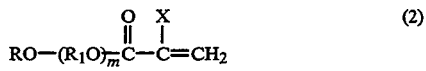
$$RO\!-\!(R_1O)_{\overline{m}}\overset{O}{\overset{\|}{C}}\!-\!\overset{X}{\overset{|}{C}}\!=\!CH_2 \quad (2)$$

wherein R represents a $C_1$–$C_{18}$ alkyl group, a $C_2$–$C_{18}$ alkenyl group, a $C_6$–$C_{18}$ aryl group, a $C_1$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; m is a positive number of 1 to 100 on the average, with the proviso that the plural $R_1$'s may be the same or different from each other; and X represents a hydrogen atom or a methyl group.

5. The liquid crystal display according to claim 4, wherein the monomer comprises a crosslinkable monomer.

6. The liquid crystal display according to claim 4, wherein the monomer comprises a crosslinkable monomer and a vinyl compound.

7. The liquid crystal display according to claim 1, wherein the spacer particles are produced by reacting core particles each having, on the surface portion of the core particle, a substituent group which reacts with a compound represented by the following formulas (3) or (4) with the compound represented by the following formulas (3) or (4):

$$RO\!-\!(R_1O)_{\overline{m}}Z \quad (3)$$

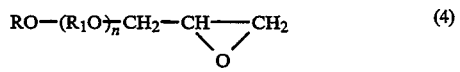
$$RO\!-\!(R_1O)_{\overline{n}}CH_2\!-\!\underset{\underset{O}{\diagdown\diagup}}{CH}\!\!-\!\!-\!\!-\!\!CH_2 \quad (4)$$

wherein R represents a $C_1$–$C_{18}$ alkyl group, a $C_2$–$C_{18}$ alkenyl group, a $C_6$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; m is a positive number of 1 to 100 on the average, with the proviso that the plural $R_1$'s may be the same or different from each other; n is zero or, on the average, a positive number of more than 0 to 100, with the proviso that the plural $R_1$'s may be the same or different from each other; and Z represents a hydrogen atom, a metal atom, an aminoalkyl group or a carboxyalkyl group.

8. The liquid crystal display according to claim 1, wherein the particles are produced by reacting core particles each having, at least on the surface portion of the core particle, a nonionic hydrophilic unit represented by the following formula (5):

$$HO\!-\!(R_1O)_{\overline{m}} \quad (5)$$

wherein $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other, with an acid halide having a $C_1$–$C_{18}$ acyl group, an acid anhydride having a $C_1$–$C_{18}$ acyl group, an isocyanate compound having a $C_1$–$C_{18}$ alkyl group, a $C_1$–$C_{18}$ acyl group or a $C_6$–$C_{18}$ aryl group, a $C_3$–$C_{18}$ α-olefin epoxide or an epoxy compound represented by the formula (4):

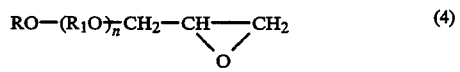
$$RO\!-\!(R_1O)_{\overline{n}}CH_2\!-\!\underset{\underset{O}{\diagdown\diagup}}{CH}\!\!-\!\!-\!\!-\!\!CH_2 \quad (4)$$

wherein R represents a $C_1$–$C_{18}$ alkyl group, a $C_2$–$C_{18}$ alkenyl group, a $C_6$–$C_{18}$ aryl group, a $C_7$–$C_{18}$ alkylaryl group, a $C_1$–$C_{18}$ acyl group, a $C_2$–$C_{18}$ alkylcarbamoyl group, a $C_2$–$C_{18}$ acylcarbamoyl group or a $C_7$–$C_{18}$ arylcarbamoyl group; $R_1$ represents a linear or branched alkylene group having 2 to 4 carbon atoms wherein a hydroxyl group may be substituted for a hydrogen atom on the alkylene group; and n is zero or, on the average, a positive number of more than 0 to 100, with the proviso that the plural $R_1$'s may be the same or different from each other.

9. Spacer particles for a liquid crystal display each having, at least on the surface portion thereof, a nonionic hydrophilic unit represented by the following formula (1):

$$RO-(R_1O)_{\overline{m}} \qquad (1)$$

wherein R represents a $C_1$-$C_{18}$ alkyl group, a $C_2$-$C_{18}$ alkenyl group, a $C_6$-$C_{18}$ aryl group, a $C_7$-$C_{18}$ alkylaryl group, a $C_1$-$C_{18}$ acyl group, a $C_2$-$C_{18}$ alkylcarbamoyl group, a $C_2$-$C_{18}$ acylcarbamoyl group or a $C_7$-$C_{18}$ arylcarbamoyl group; $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other.

10. The spacer particles for a liquid crystal display according to claim 9, wherein the standard deviation of the spacer particle diameter distribution is within 20% or less of the average particle diameter.

11. A process for producing spacer particles for a liquid crystal display which comprises copolymerizing a monomer with a compound represented by the following formula (2):

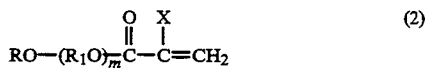
$$RO-(R_1O)_{\overline{m}}\overset{O}{\underset{\|}{C}}-\overset{X}{\underset{|}{C}}=CH_2 \qquad (2)$$

wherein R represents a $C_1$-$C_{18}$ alkyl group, a $C_2$-$C_{18}$ alkenyl group, a $C_6$-$C_{18}$ aryl group, a $C_7$-$C_{18}$ alkylaryl group, a $C_1$-$C_{18}$ acyl group, a $C_2$-$C_{18}$ alkylcarbamoyl group, a $C_2$-$C_{18}$ acylcarbamoyl group or a $C_7$-$C_{18}$ arylcarbamoyl group; $R_1$ represents a linear or branched alkylene group having 2 to 4 carbon atoms wherein a hydroxyl group may be substituted for a hydrogen atom on the alkylene group; m is a positive number of 1 to 100 on the average, with the proviso that the plural $R_1$'s may be the same or different from each other; and X represents a hydrogen atom or a methyl group.

12. The process for producing spacer particles for a liquid crystal display according to claim 11, wherein the monomer comprises a crosslinkable monomer.

13. The process for producing spacer particles for a liquid crystal display according to claim 11, wherein the monomer comprises a crosslinkable monomer and a vinyl compound.

14. A process for producing spacer particles for a liquid crystal display which comprises reacting core particles each having, on the surface portion of the core particle, a substituent group which reacts with a compound represented by the following formulas (3) or (4) with the compound represented by the following formulas (3) or (4):

$$RO-(R_1O)_{\overline{m}}Z \qquad (3)$$

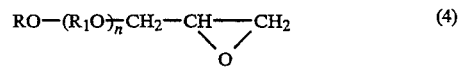
$$RO-(R_1O)_{\overline{n}}CH_2-CH\underset{\underset{O}{\diagdown\diagup}}{\text{———}}CH_2 \qquad (4)$$

wherein R represents a $C_1$-$C_{18}$ alkyl group, a $C_2$-$C_{18}$ alkenyl group, a $C_6$-$C_{18}$ aryl group, a $C_7$-$C_{18}$ alkylaryl group, a $C_1$-$C_{18}$ acyl group, a $C_2$-$C_{18}$ alkylcarbamoyl group, a $C_2$-$C_{18}$ acylcarbamoyl group or a $C_7$-$C_{18}$ arylcarbamoyl group; $R_1$ represents a linear or branched alkylene group having 2 to 4 carbon atoms wherein a hydroxyl group may be substituted for a hydrogen atom on the alkylene group; m is a positive number of 1 to 100 on the average, with the proviso that the plural $R_1$'s may be the same or different from each other; n is zero or, on the average, a positive number of more than 0 to 100, with the proviso that the plural $R_1$'s may be the same or different from each other; and Z represents a hydrogen atom, a metal atom, an aminoalkyl group or a carboxyalkyl group.

15. A process for producing spacer particles for a liquid crystal display which comprises reacting core particles each having, at least on the surface portion of the core particle, a nonionic hydrophilic unit represented by the following formula (5):

$$HO-(R_1O)_{\overline{m}} \qquad (5)$$

wherein $R_1$ represents a linear or branched alkylene group having 2 to 4 carbon atoms wherein a hydroxyl group may be substituted for a hydrogen atom on the alkylene group; and m is a positive number of 1 to 100 on the average, with the proviso that the plural $R_1$'s may be the same or different from each other, with an acid halide having a $C_1$-$C_{18}$ acyl group, an acid anhydride having a $C_1$-$C_{18}$ acyl group, an isocyanate compound having a $C_1$-$C_{18}$ alkyl group, a $C_1$-$C_{18}$ acyl group or a $C_6$-$C_{18}$ aryl group, a $C_3$-$C_{18}$ $\alpha$-olefin epoxide or an epoxy compound represented by the formula (4):

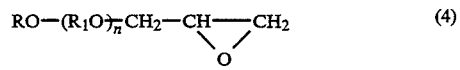
$$RO-(R_1O)_{\overline{n}}CH_2-CH\underset{\underset{O}{\diagdown\diagup}}{\text{———}}CH_2 \qquad (4)$$

wherein R represents a $C_1$-$C_{18}$ alkyl group, a $C_2$-$C_{18}$ alkenyl group, a $C_6$-$C_{18}$ aryl group, a $C_7$-$C_{18}$ alkylaryl group, a $C_1$-$C_{18}$ acyl group, a $C_2$-$C_{18}$ alkylcarbamoyl group, a $C_2$-$C_{18}$ acylcarbamoyl group or a $C_7$-$C_{18}$ arylcarbamoyl group; $R_1$ represents a linear or branched alkylene group having 2 to 4 carbon atoms wherein a hydroxyl group may be substituted for a hydrogen atom on the alkylene group; and n is zero or, on the average, a positive number of more than 0 to 100, with the proviso that the plural $R_1$'s may be the same or different from each other.

* * * * *